Aug. 25, 1925.  
R. F. KNIGHT  
1,550,702  
MEASURING APPARATUS  
Filed Jan. 2, 1920
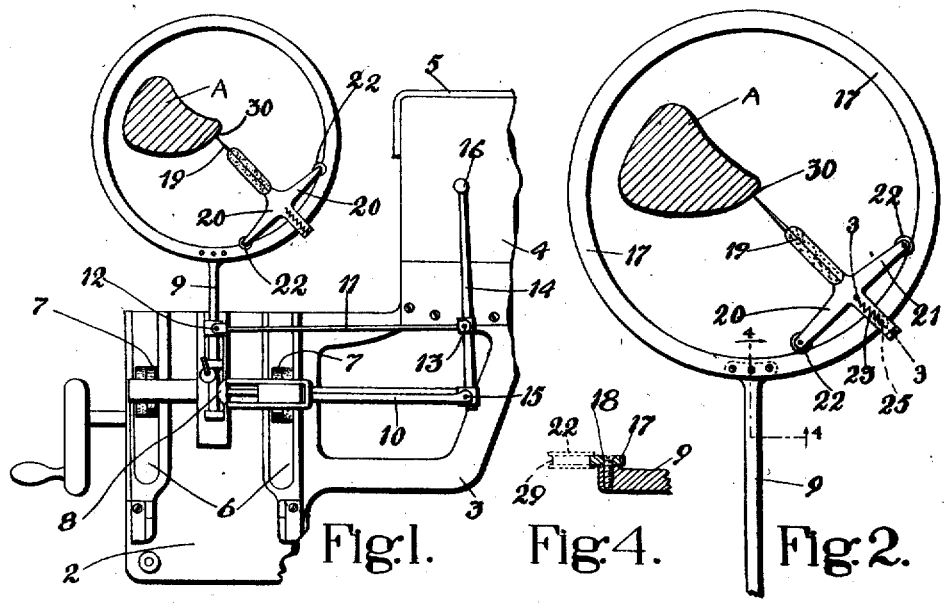
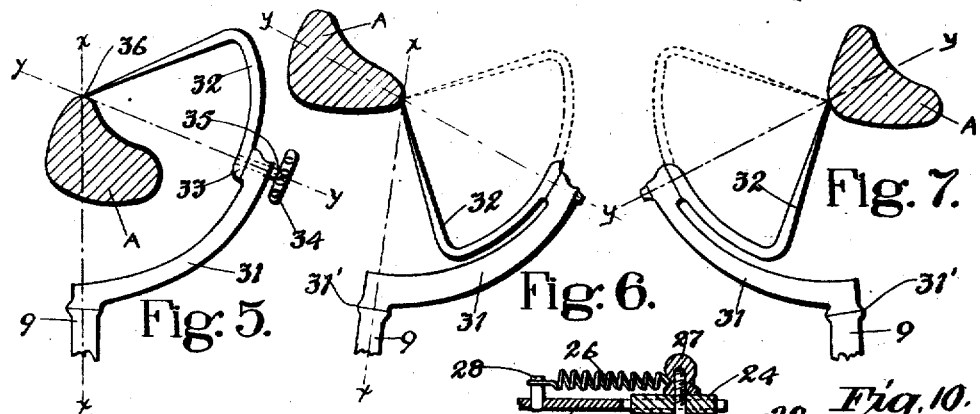
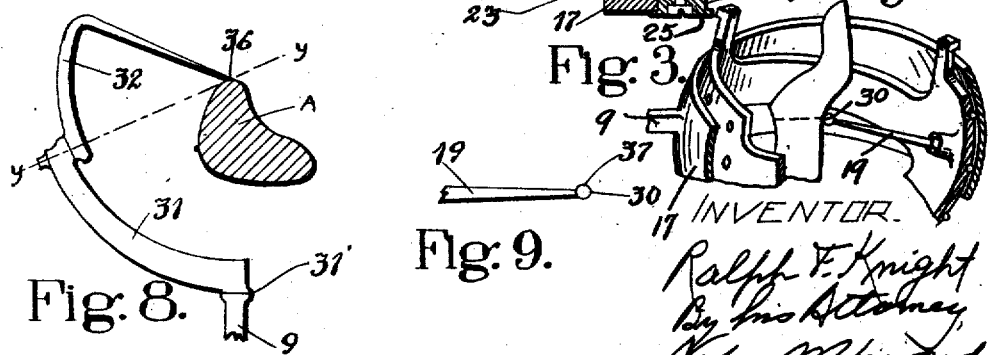

Patented Aug. 25, 1925.                                                                                   1,550,702

UNITED STATES PATENT OFFICE.

RALPH F. KNIGHT, OF BEVERLY, MASSACHUSETTS, ASSIGNOR TO UNITED SHOE MACHINERY CORPORATION, OF PATERSON, NEW JERSEY, A CORPORATION OF NEW JERSEY.

MEASURING APPARATUS.

Application filed January 2, 1920. Serial No. 348,796.

*To all whom it may concern:*

Be it known that I, RALPH F. KNIGHT, a citizen of the United States, residing at Beverly, in the county of Essex and State of Massachusetts, have invented certain Improvements in Measuring Apparatus, of which the following description, in connection with the accompanying drawings, is a specification, like reference characters on the drawings indicating like parts in the several figures.

The invention to be hereinafter described relates to machines for measuring bodies and more particularly for ascertaining areas or other characteristics such as moments of inertia, positions of centers of mass, etc., of inaccessible sections of solid or semi-solid bodies. It is disclosed herein by way of illustration as embodied in a machine particularly adapted for measuring areas of cross-sections of a shoe last, but is not restricted thereto as it may be used advantageously to measure sectional characteristics of other solid or semi-solid bodies.

In designing shoe lasts, it has been the custom heretofore to establish or determine their lateral solid characteristics by tape measurements over the external surfaces of the lasts, particularly by measurements of the perimeters at certain points, but such measurements give no information of the shape or area of the measured portion of a last nor the "foot-room" provided thereby. Planimetric and pantagraphic measurements which would give such information have been possible only by cutting the lasts on the sections to be measured, thereby destroying the lasts.

By the invention disclosed and claimed in United States Letters Patent No. 1,451,730, granted April 17, 1923, on the application of John J. Heys, there was provided for the first time a machine and method or process by the use of which planimetric measurements could be made without destroying the last. With a view to making it practicable to obtain this result with even greater facility, the invention disclosed and claimed in United States Letters Patent No. 1,503,498, granted Aug. 5, 1924, on application of John B. Hadaway provided a plurality of tracers constructed to extend around opposite sides of the body to be measured, one tracer taking up the traverse where the limitations of space compelled the other to drop it, thus retaining advantageous features and characteristics of the invention of Patent No. 1,451,730, but rendering it no longer necessary to divide the measured area into separately measured parts. Like its predecessor invention just mentioned, the invention of Patent No. 1,503,498, was successful in solving the problems to which it was addressed, and constituted a very important advance in the art.

Still further to facilitate obtaining planimetric measurements without destroying the lasts or other objects measured and to obtain the desired results in the simplest and most advantageous manner possible and without sacrificing any of the advantageous features characteristic of the prior constructions referred to, the present invention, considered in one aspect, provides for obtaining planimetric measurements by a single tracer point, which, as shown, is movable completely about the body to be measured while in contact with the surface thereof. In the illustrated embodiment of the invention, the tracer point is connected to the tracer arm of an ordinary planimeter so that the tracer point may be moved completely about and in contact with the surface of the body being measured, on the plane of section, with the result that the desired data of the plane of section may be had by one continuous movement of the single tracer point completely about the body and in contact therewith without the necessity of shifting the position of the body or last being measured, or of interchanging tracing points in the midst of the operation.

In the machines of this general class, that is, in machines for measuring characteristics of inaccessible sections of a solid or semi-solid body or last, the tracer point is carried by a tracer, the inclination of which to the irregular surface of the body being measured, may change from time to time as the tracer point is moved upon the body. It is impracticable to maintain absolute sharpness of the physical tracing point used and it would be disadvantageous to do so if it were practicable, since a very sharp point would catch, especially in work upon wood, and seriously disturb the action of the integrating mechanism. It follows, therefore, that inaccuracies in planimetrical measurement arise from variations in the angle at which the tracer is presented to the surface of the body being measured. As already suggested, the point is necessarily somewhat blunt and the presentation of the tracer at a substantial angle to the normal at any point in the periphery of the section being measured will tilt the true end of the tracer (the tracing point) on the adjacent material of the tracer and move it away from (and always outside of) the perimeter being traversed, causing the instrument always to read too large. In view of these facts, it is another object of my invention to provide an improved organization of tracer carrying arm by use of which the tracing point may always be positioned substantially perpendicularly to the surface or perimeter being traversed, so that the tracing point can be kept on or at most at a minimum distance from the desired path, and an important feature of the invention, accordingly, consists in a novel organization of tracing point carrying means whereby the tracing point may be so presented as to be substantially along the normal at each point of the periphery being treated. Conveniently, as in the machine shown, provision is made for a movement of the tracer relatively to its supporting mechanism, and preferably this movement is effected continuously during a measurement, so that the tracer may be in proper position at all points of the body treated.

The above described and other objects of the invention are secured in the machine shown by a circular tracer carrier, on which the tracer is mounted for movement around the circle, with its tracing point always in the center of the circle. The tracer may thus be presented to the work at any angle whatever, from 0° to 360° from any zero position.

The above and other features of the invention, as well as novel combinations of parts, will be further developed in the following description and accompanying drawings showing two good practical forms or embodiments thereof, and the novel characteristics will then be defined by the claims.

In the drawings:

Fig. 1 is a plan view of a machine embodying the present invention, some of the parts being broken away;

Fig. 2 is an enlarged plan view showing one practical embodiment of the invention;

Fig. 3 is an enlarged detail in section of the construction shown by Fig. 2, the section being taken on line 3—3 of Fig. 2;

Fig. 4 is a section on the line 4—4 of Fig. 2 showing the roller engagement of the tracer with the tracer carrier;

Fig. 5 is an enlarged plan view showing another form of the invention, the planimeter and adjacent parts being omitted for the purpose of clearness of illustration and the parts in Fig. 5 being indicated in the position they may occupy in starting the measurement of an area of an inaccessible section;

Fig. 6 is a view similar to that of Fig. 5 showing the parts in a later position as the tracer point is carried about and over the surface of the body or last being measured;

Fig. 7 is a view of the same parts in a later position as the tracer point is carried about the body;

Fig. 8 is a view of the same parts in the position they occupy when the tracer point has completed its movement about the body being measured.

Fig. 9 is an enlarged or exaggerated view showing the end of the tracer and the tracer point.

Fig. 10 illustrates a modified form of tracer mechanism.

The integrator and the support for the body or last to be measured may be associated in operative relation upon a suitable base or otherwise, having provision for relative movement of the last and integrator to bring any desired section of the last into the integrating plane, as convenience may dictate, such, for instance, as a vertical slide operated by a handle 1, as disclosed in the patent to John J. Heys heretofore noted, and the United States Letters Patent No. 1,395,310, granted Nov. 1, 1921, on application of Frank H. Thompson. An ordinary commercially obtainable planimeter is shown, but any desired mechanical integrator may be used. In the present construction the table 2 has a side extending arm or bracket 3 carrying a flat surface 4 and clamp 5 for holding a piece of paper or the like. The table 2 is provided with the usual tracks 6 on which travel the rolls 7 of the planimeter 8. The recording mechanism of the instrument shown is caused to operate by carrying the end of its tracer arm 9 around the area which it is desired to measure which, in this instance, is shown as the cross section of a last A. An arm 10 extends rigidly from the planimeter and an arm 11 is pivotally connected at 12 to the arm 9 and connected pivotally at 13 to the scribing arm 14 which is pivoted at 15 to the arm 10, such scribing arm being provided, if desired, with a pencil or other marker 16, and being equal in length to the tracer arm. The parts 9, 10, 11, 14 form a parallelogram at all times, and the movement of the scriber at 16 will be at all times equal to that of the tracing point at the end of the arm 9. All of the above parts and mechanisms may be substantially as shown and described in the patent of John J. Heys heretofore mentioned, so that the foregoing description will be sufficient to indicate the general character and operativeness of the planimeter and its described connections.

As hereinbefore indicated, one of the important features of the present invention consists in providing the planimeter with a single tracer point that may be moved completely about and in contact with the body to be measured on the line of section without shifting or moving the body itself. This characteristic of the invention may be carried into effect in various ways, with respect to which, however, the present invention is broad and generic in character.

Referring to Figs. 1 to 4, inclusive, the tracer arm 9 is provided with a tracer carrier 17 which, as indicated, consists of a circular ring sufficiently large to include within it a body of more than twice the dimensions of the body or last A, sections of which are to be measured. The ring or carrier 17 may be variously contrived but in the present instance of the invention it consists of a metal band, cross sections of which are indicated in Figs. 3 and 4, secured to the tracer arm 9 by appropriate means. The body or last A, sections of which are to be measured, will be supported within the tracer carrier 17, the supports for the body or last being of appropriate character.

The tracer 19, Figs. 1 and 2, has the side arms 20, 21 projecting therefrom each provided with a roller 22 which bears upon the inner periphery of the tracer carrier 17. The tracer has a rearwardly extending arm 23 in which is slidably mounted the block 24, as indicated in Fig. 3. The block 24 may be mounted in a slot in the arm 23, as indicated, and its side edge portions provided with a rabbet or groove to embrace the side walls of the slot, the construction being such that the block 24 may be slidably mounted on the tracer 19. The block 24 carries a roller 25 adapted to engage the exterior periphery of the carrier 17, and a spring 26 having one end attached to the block 24 by the pin or knob 27 and its other end to the tracer 19 by the pin 28, serves normally to cause the rolls 22 and 25 to embrace between them yieldingly the carrier 17 and yet permit the tracer 19 to be moved circumferentially of the carrier.

In order that the rolls 22 and 25 may properly support the tracer 19 in its operative position on the carrier 17, they may be grooved, as indicated at 29, to embrace the interior peripheral edges of the carrier 17. Any other practical mechanism may be substituted for the arms 20, 21, 23 and their associated parts.

At the end of the tracer 19 is the tracer point 30 which, in the present instance of the invention, should occupy the centre of the circular carrier 17. The circular form of the carrier 17 will keep the tracing point in the same position regardless of the position of the tracer 19 in the carrier 17, as it is rolled around the circle. Thus the tracer 19, having the tracing point on its end may always be presented perpendicularly to the periphery being traversed and the roller bearings provide for the accomplishment of this object with such smoothness that it is unnecessary to stop the traverse of the periphery in order to reset the tracer 19. The tracer 19 may thus be swung continuously and the periphery be traversed continuously around the body with the great advantage of obtaining the planimetrical measurement in one simple continuous operation. The operator never has to remove his hand from the tracer 19 from the beginning to the end. The smoothness of the operation is much enhanced by the blunt form of tracing point shown in Fig. 9. The position of the actual tracing point is at the point 30 which is the intersection of the main axis of the tracer 19 with the rounded surface 37, and is exactly as may be at the center of the circle 17. It is possible to use a blunt tracer without appreciable error since the tracer is always presented to the object substantially along the normal to the section periphery, and the point 30 is therefore tipped to a minimum extent out of the true periphery being traced. If greater accuracy is desired, the carrier 17 may be made segmentally spherical (see Fig. 10) so that the tracer can be presented along the normal to the surface as distinguished from the section perimeter. In the measurement of lasts the form illustrated in Fig. 1 works well enough.

The scriber 16 will reproduce the traced outline upon the paper at 4.

The above described form or embodiment of the invention shows the carrier which supports the tracer as completely surrounding the body or last to be measured, but the invention is generic with respect to the movement of the single tracer point in a complete circuit about the body or last on the line of section being measured and contemplates various other forms to carry this feature of the invention into practical effect. Another construction is indicated in Figs. 5, 6, 7 and 8 in which the carrier 31 is pivotally connected to the tracer arm 9 as at 31' so that the carrier 31 may be swung about the longitudinal axis of the tracer arm 9 to place the tracer 32 at one side of the tracer arm 9, Figs. 5 and 6, and then may be swung into the position indicated in either Fig. 7 or 8, to carry the tracer 32 to the other side of the tracer arm 9, a condition which may be required when completing the movement of the tracer point about the body or last upon the line of section being measured.

The tracer 32 in the form of the invention now being described is pivotally mounted at 33 on the tracer carrier 31. This pivotal connection between the tracer and tracer carrier may be variously contrived but in the illustrated construction the tracer 32 is carried on the pivot pin extending through the tracer carrier 31 and the end portion of said pin carries a milled head 34, Fig. 5, whereby the tracer 32 may be swung, as will presently appear. A spring 35 may be interposed between the milled head 34 and the carrier 31 to maintain the tracer 32 in the position to which it may be adjusted by the milled head.

The tracer 32, as indicated in Figs. 5 to 8 inclusive, is formed as a sharply bent arm, and such tracer carries the tracer point 36 which is adapted to move over the surface of the body or last as it travels about the same.

The tracer point 36 is at the intersection of the axis of the pivotal connection at 31′ and the axis about which the tracer 32 turns on its connection with the tracer carrier 31, this relation of the tracer point to the longitudinal axis of the tracer arm being indicated in Fig. 5 wherein the dotted line $x$—$x$ indicates the axis of the pivotal connection 31′ and wherein also the line $y$—$y$ indicates the axis about which the tracer 32 is pivoted relatively to the tracer carrier 31. The carrier 31 is not necessarily circular, but may be of any desired form.

A convenient method of measuring the sectional area of a body by the last-described form or embodiment of the invention will now be described. The tracer carrier 31 will be moved to one side of the tracer arm as indicated in Fig. 5, and the tracer 32 will be swung upon its pivotal connection with the tracer carrier, to place the tracer point 36 in contact with the surface of the body preferably most remote from the end of the tracer arm. The tracer point will then be moved along the surface of the body to the right from the position indicated in Fig. 5 to that indicated in Fig. 6 at which time a normal to the surface of the body where the surface changes directions will be substantially in the line $y$—$y$, that is, the axis about which the tracer moves relatively to the tracer carrier. The tracer 32 will then be moved about the axis $y$—$y$ from the dotted to the full line position, Fig. 6, and the tracer point will then be moved along the surface of the body from the position, Fig. 6, to that of Fig. 7, where, in view of the changing direction of the surface of the body, the carrier 31 will be swung about the axis $x$—$x$ from the position indicated in Fig. 6 to that of Fig. 7, such movement of the carrier preferably being made when the line $x$—$x$ in Fig. 6 is normal to the surface of the body at the point of contact between the tracer point and body. In order that the tracer point 36 may be carried completely around to the initial or starting point of its movement, the tracer 32 may be swung on its pivotal connection with the tracer carrier from the full to the dotted line position, Fig. 7, and the parts finally take the position as indicated in Fig. 8 which completes the complete circuit about the body.

Having described my invention, what I claim as new and desire to secure by Letters Patent of the United States is:—

1. In a machine for measuring inaccessible sections of a solid body, the combination of an integrator tracer arm and a single tracer point mounted on the tracer arm for movement in the plane of section continuously and completely around the body while in contact with its surface.

2. In a machine of the class described, the combination of a tracer arm, a tracer point, and connections between the tracer arm and tracer point, including a support for the tracer point affording a closed path, operable to effect continuous movement of the tracer point over the surface of and entirely around a body having substantial extent beyond the general locus of action of the tracer arm.

3. In a machine of the class described, the combination of a tracer arm, a tracer point in axial alinement with the tracer arm, and connections between the tracer arm and tracer point permitting continuous movement of the tracer point over the surface of and completely about the intermediate portion of a solid body while in contact therewith.

4. In a machine for measuring sections of a body, the combination of a hollow support encircling the body and carrying a tracer arm having a tracer point movable continuously over the surface of a body in the plane of an intermediate section and completely about the body while in contact therewith that an entire section may be measured by a single tracer point without moving the body.

5. An integrator having a tracer arm, a ring mounted thereon, and a tracer point movable upon the ring and extending toward its center for continuous movement over the perimeter of and completely about an intermediate section of the body while in contact therewith that a complete section of the body may be measured by a single tracer point without moving the body.

6. In a machine for measuring inaccessible sections of a body, the combination of a tracer arm, a tracer carrier, a tracer, and a tracer point, the parts being constructed and arranged for continuous movement of the tracer point completely about an intermediate section of the body while in contact with the perimeter thereof while the body remains in fixed position.

7. In a machine for measuring inaccessible sections of a body, the combination of a tracer arm, a tracer point, and means for supporting the tracer point in axial alinement with the tracer arm and permitting the tracer point to be moved continuously completely about a desired section of the body in contact with the perimeter thereof.

8. In a machine of the class described, the combination of the tracer arm, a tracer carrier connected thereto, a tracer movable with respect to the carrier, and a tracer point connected to the tracer, the parts being constructed and arranged to permit continuous movement of the tracer point completely about a body in an intermediate plane of section while in contact with the body.

9. A mechanical integrator, comprising, in combination, a tracer point, a tracer arm, and means for supporting the tracer point from the tracer arm, including a tracer carrier extending from the tracer arm and with respect to which the tracer is movable to make a continuous complete circuit around a body to be measured.

10. A mechanical integrator having a tracer arm, a tracer point, a tracer carrier mounted on the tracer arm and arranged to support a tracer in varying selected orientations, and a tracer interposed between the carrier and tracer point, and movable along the carrier to assume a position substantially along the normal to the surface of a body at each point of a continuous periphery traversed by the tracer point.

11. A mechanical integrator having a tracer carrying a tracer point and a tracer carrier for supporting the tracer and arranged to accommodate it in any desired orientation approximating a given plane and relatively to which the tracer is continuously movable to maintain the tracer at a substantially uniform angle with the line traversed by the tracer.

12. A machine for measuring areas of inaccessible sections of a body, comprising a tracer arm, a tracer carrier connected to the tracer arm, a tracer having a tracer point and mounted for continuous movement on the tracer carrier to maintain the tracer in uniform angular relation to the surface traversed by it during a measurement.

13. In a machine of the class described, the combination of a tracer carrying a tracer point, a tracer carrier, and connections between the tracer and tracer carrier operable to effect continuous relative movements thereof to maintain the tracer in normal relation to the surface of the measured body during the traverse of a complete periphery thereof.

14. In a machine of the class described, the combination of a tracer carrier comprising a concave contour arranged substantially to surround a body to be measured, a tracer mounted on the tracer carrier and movable around the contour, and a tracer point on the tracer and thereby movable completely about an intermediate section of the body while in continuous contact with the periphery thereof.

15. In a machine of the class described, the combination of a tracer carrying a tracer point, an O-shaped tracer carrier, and connections between the tracer and tracer carrier permitting relative movements thereof to preserve the continuity of the measuring operation around a complete periphery of the measured object.

16. In a machine of the class described, the combination of a tracer arm and a tracer point, a substantially circular tracer carrier connected to the tracer arm, and a tracer having its tracing point at the center of the circle and mounted for movement completely around the carrier.

17. In a machine for measuring inaccessible sections of a body, the combination of a tracer arm, a tracer having a tracer point for engaging the surface of the body, a tracer carrier on which the tracer is pivotally mounted and permitting pivotal movement over an extent of substantially 360°, and connections between the tracer arm and tracer carrier permitting the carrier to move the pivotal connection of the tracer therewith to different positions relatively to the tracer arm incidental to a complete and continuous traverse of a periphery of the body by the tracer.

18. In a machine for measuring inaccessible sections of a body, the combination of the tracer arm of a planimeter, a tracer point constructed and arranged to be moved continuously around a complete periphery of a body, and a member interposed between the tracer point and tracer arm and movable relatively to the tracer arm to carry the tracer to either side of the tracer arm.

19. A mechanical integrator having a tracer constructed and arranged to be operable in a substantially uniform angular relation to the surface of an object being measured, said tracer having a rounded tracer point, having the ideal tracing point in its surface.

20. A mechanical integrator having a tracer operable at substantial perpendicularity to the surface of a body being measured, said tracer having a rounded tracer point to facilitate traverse over the body, the rounded point having the ideal tracing point in its surface.

21. A mechanical integrator having a tracer continuously movable to maintain a substantially uniform angular relation to the surface of the body being measured, said tracer having a blunt tracing point to insure smoothness in traverse, the blunt point having the ideal tracing point in its surface.

22. A mechanical integrator comprising a tracer carrier arranged substantially to encircle the object to be measured, and a tracer movable on the carrier to present its tracing point to all parts of a periphery of the object in one continuous operation.

23. A mechanical integrator comprising a circular tracer carrier, and a tracer movable upon it with its tracing point at the center of the circle, whereby the complete perimeter of an object encircled by the carrier may be traversed in one operation.

24. A mechanical integrator comprising a hollow tracer carrier arranged to support a tracer movable upon it in three dimensions in such manner as to keep its ideal tracing point at the same position relatively to the carrier during a complete and continuous circuit of a body being measured.

25. A mechanical integrator comprising a tracer carrier, and a tracer movable upon it in three dimensions to assume varying vertical and horizontal angles as desired in such manner as to keep its ideal tracing point at the same position relatively to the carrier during a complete and continuous circuit of a body being measured, the tracer having a blunt end with the ideal tracing point in its surface.

26. A mechanical integrator comprising a tracer carrier shaped as a portion of a sphere, and a tracer movable upon it with its tracing point at the center of the sphere, whereby the complete perimeter of an object encircled by the carrier may be traversed in one operation.

In testimony whereof I have signed my name to this specification.

RALPH F. KNIGHT.

point to facilitate traverse over the body, the rounded point having the ideal tracing point in its surface.

21. A mechanical integrator having a tracer continuously movable to maintain a substantially uniform angular relation to the surface of the body being measured, said tracer having a blunt tracing point to insure smoothness in traverse, the blunt point having the ideal tracing point in its surface.

22. A mechanical integrator comprising a tracer carrier arranged substantially to encircle the object to be measured, and a tracer movable on the carrier to present its tracing point to all parts of a periphery of the object in one continuous operation.

23. A mechanical integrator comprising a circular tracer carrier, and a tracer movable upon it with its tracing point at the center of the circle, whereby the complete perimeter of an object encircled by the carrier may be traversed in one operation.

24. A mechanical integrator comprising a hollow tracer carrier arranged to support a tracer movable upon it in three dimensions in such manner as to keep its ideal tracing point at the same position relatively to the carrier during a complete and continuous circuit of a body being measured.

25. A mechanical integrator comprising a tracer carrier, and a tracer movable upon it in three dimensions to assume varying vertical and horizontal angles as desired in such manner as to keep its ideal tracing point at the same position relatively to the carrier during a complete and continuous circuit of a body being measured, the tracer having a blunt end with the ideal tracing point in its surface.

26. A mechanical integrator comprising a tracer carrier shaped as a portion of a sphere, and a tracer movable upon it with its tracing point at the center of the sphere, whereby the complete perimeter of an object encircled by the carrier may be traversed in one operation.

In testimony whereof I have signed my name to this specification.

RALPH F. KNIGHT.

Certificate of Correction.

It is hereby certified that in Letters Patent No. 1,550,702, granted August 25, 1925, upon the application of Ralph F. Knight, of Beverly, Massachusetts, for an improvement in "Measuring Apparatus," an error appears in the printed specification requiring correction as follows: Page 4, line 112, claim 4, strike out the words "tracer arm having a" and insert the same before the word "hollow" in line 110, same page, and claim; and that the said Letters Patent should be read with this correction therein that the same may conform to the record of the case in the Patent Office.

Signed and sealed this 27th day of October, A. D. 1925.

[SEAL.]

KARL FENNING,
*Acting Commissioner of Patents.*

Certificate of Correction.

It is hereby certified that in Letters Patent No. 1,550,702, granted August 25, 1925, upon the application of Ralph F. Knight, of Beverly, Massachusetts, for an improvement in "Measuring Apparatus," an error appears in the printed specification requiring correction as follows: Page 4, line 112, claim 4, strike out the words "tracer arm having a" and insert the same before the word "hollow" in line 110, same page, and claim; and that the said Letters Patent should be read with this correction therein that the same may conform to the record of the case in the Patent Office.

Signed and sealed this 27th day of October, A. D. 1925.

[SEAL.]
KARL FENNING,
*Acting Commissioner of Patents.*